US009567946B2

(12) United States Patent
Hasegawa et al.

(10) Patent No.: US 9,567,946 B2
(45) Date of Patent: Feb. 14, 2017

(54) ASSEMBLING UNIT, PUMP AND FUEL-VAPOR-LEAKAGE CHECK SYSTEM

(71) Applicant: DENSO CORPORATION, Kariya, Aichi-pref. (JP)

(72) Inventors: Shigeru Hasegawa, Nagoya (JP); Tomohiro Itoh, Tokai (JP); Kosei Takagi, Nagoya (JP); Ryoyu Kishi, Obu (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 14/590,160

(22) Filed: Jan. 6, 2015

(65) Prior Publication Data

US 2015/0198121 A1    Jul. 16, 2015

(30) Foreign Application Priority Data

Jan. 14, 2014    (JP) .................................. 2014-004000

(51) Int. Cl.
  *F04B 49/00*    (2006.01)
  *F02M 25/08*    (2006.01)
  *F16J 15/06*    (2006.01)

(52) U.S. Cl.
  CPC ..... *F02M 25/0809* (2013.01); *F02M 25/0836* (2013.01); *F16J 15/06* (2013.01); *Y10T 137/85986* (2015.04)

(58) Field of Classification Search
  CPC .. F02M 25/0809; F02M 25/0836; F16J 15/06; F16J 15/062; Y10T 137/85986
  USPC ...................................................... 277/382
  See application file for complete search history.

(56) References Cited

U.S. PATENT DOCUMENTS

| 5,722,667 | A  | * | 3/1998 | Lim ........................ F16J 15/104 277/362 |
| 7,234,344 | B2 | * | 6/2007 | Inagaki ................. F01C 21/104 418/131 |
| 7,993,119 | B2 | * | 8/2011 | Kobayashi ......... F02M 25/0809 418/131 |
| 2005/0047937 | A1 |  | 3/2005 | Inagaki et al. |
| 2007/0144483 | A1 |  | 6/2007 | Torii et al. |
| 2012/0043331 | A1 |  | 2/2012 | Nameki et al. |
| 2014/0026867 | A1 | * | 1/2014 | Itoh .................... F02M 25/0809 123/520 |

FOREIGN PATENT DOCUMENTS

| JP | 2009-097684 | 5/2009 |
| JP | 2012-207738 | 10/2012 |

OTHER PUBLICATIONS

Office Action (3 pages) dated Jan. 26, 2016, issued in corresponding Japanese Application No. 2014-004000 and English translation (3 pages).

* cited by examiner

*Primary Examiner* — Jessica Cahill
(74) *Attorney, Agent, or Firm* — Nixon & Vanderhye PC

(57) ABSTRACT

A first tubular portion has a cross sectional shape which is a non-perfect circle relative to an axis thereof. A second tubular portion is disposed concentrically with the first tubular portion. The second tubular portion has a cross sectional shape relative to its axis, which is a congruent shape of the cross sectional shape of the first tubular portion. A sealing member is disposed between the first tubular portion and the second tubular portion for sealing therebetween. The sealing member has a cross sectional shape of which length parallel to its axis is greater than length which is perpendicular to the axis.

8 Claims, 8 Drawing Sheets

INSERT DIRECTION

ASSEMBLING UNIT, PUMP AND FUEL-VAPOR-LEAKAGE CHECK SYSTEM

CROSS-REFERENCE TO RELATED APPLICATION

This application is based on Japanese Patent Application No. 2014-4000 filed on Jan. 14, 2014, the disclosure of which is incorporated herein by reference.

TECHNICAL FIELD

The present disclosure relates to an assembling unit, a pump and a fuel-vapor-leakage check system

BACKGROUND

Conventionally, it is known that an assembling unit has a first tubular portion, a second tubular portion and a sealing member which is disposed between the first tubular portion and the second tubular portion air-tightly and liquid-tightly. US-2005-0047937A1 (JP-Patent No. 4203909) shows a fuel-vapor-leakage check system in which a first tubular portion is integrally formed with a suction portion of a vane pump. Moreover, a second tubular portion has an annular groove on its outer wall. An annular shaped sealing member made of rubber is disposed in the annular groove. The second tubular portion with the sealing member is inserted into an interior of the first tubular portion, so that an assembling unit is formed.

In the above fuel-vapor-leakage check system, when the second tubular portion with the sealing member is inserted into the first tubular portion, an inner periphery of the sealing member is in contact with the annular groove and an outer periphery of the sealing member is in contact with an outer wall surface of the first tubular portion. When the first tubular portion and the second tubular portion relatively move in their axial direction, the sealing member is rotated in such a manner that the inner periphery moves toward the outer periphery and the outer periphery moves toward the inner periphery.

In the fuel-vapor-leakage check system shown in US-2005-0047937A1, the first tubular portion and the second tubular portion are formed cylindrical. Moreover, before the sealing member is engaged with the groove, an inner diameter of the sealing member is slightly larger than an outer diameter of the groove. Thus, when the sealing member is engaged with the groove, a strained force of the sealing member is uniform around the second tubular portion. Moreover, before the sealing member is engaged with the groove, a cross sectional shape of the sealing member is circle. That is, the sealing member is an O-ring. Therefore, when the second tubular portion with the sealing member is inserted in first tubular portion, the sealing member is rotated equally without respect to its circumferential position. It is considered that no twist is generated in the sealing member.

In recent years, it has been required that a fuel-vapor-leakage check system including a vane pump is reduced in its size. For example, when a thickness of the vane pump is reduced, an axial length of a cam ring is reduced. That is, a height of the cam ring is lowered. In a case that a suction portion is formed in an outer wall of the cam ring, it is necessary to form the suction portion based on the height of the cam ring in order to ensure a fluid passage area of the suction portion. That is, it is necessary that the suction portion is a non-perfect circle In a case that the first tubular portion is integral with the suction portion of the vane pump, it is necessary that the cross sectional shapes of the first and the second tubular portion correspond to the shape of the suction portion. When the sealing member is engaged with the second tubular portion of which cross sectional shape is a non-perfect circle, the strained force of the sealing member is not uniform around the second tubular portion. Therefore, when the second tubular portion with the sealing member is inserted in first tubular portion, the sealing member is rotated unequally with respect to its circumferential position. It is likely that a twist may be generated in the sealing member A twist of the sealing member may cause deterioration in airtightness and liquid-tightness between the first tubular portion and the second tubular portion. Such deterioration also causes deterioration in suction performance of the vane pump falls, whereby a detection accuracy of the fuel-vapor-leakage may be deteriorated.

SUMMARY

It is an object of the present disclosure to provide an assembling unit, a pump and a fuel-vapor-leakage check system which has a high airtightness and a high liquid-tightness between a first tubular portion and a second tubular portion without respect to shapes of the first tubular portion and the second tubular portion.

An assembling unit is provided with a first tubular portion, a second tubular portion and a sealing member. The first tubular portion has a cross sectional shape which is a non-perfect circle relative to an axis thereof. The second tubular portion is disposed concentrically with the first tubular portion. The second tubular portion has a cross sectional shape relative to its axis, which is a congruent shape of the cross sectional shape of the first tubular portion.

The sealing member is annularly shaped and is made from rubber of which elasticity modulus is less than a specified value. The sealing member keeps an air-tightness and a liquid-tightness between the first tubular portion and the second tubular portion. The sealing member has a cross sectional shape of which length parallel to its axis is greater than length which is perpendicular to the axis.

Since the cross sectional shape of the first tubular portion relative to the axis is a non-perfect circle, a strained force of the sealing member is not uniform around the first tubular portion when the sealing member is disposed around the first tubular portion.

Thus, it can be restricted that the sealing member is rotated between the first tubular portion and the second tubular portion. Also, it can be restricted that a twist is generated in the sealing member. As a result, the airtightness and the liquid-tightness between the first tubular portion and the second tubular portion can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
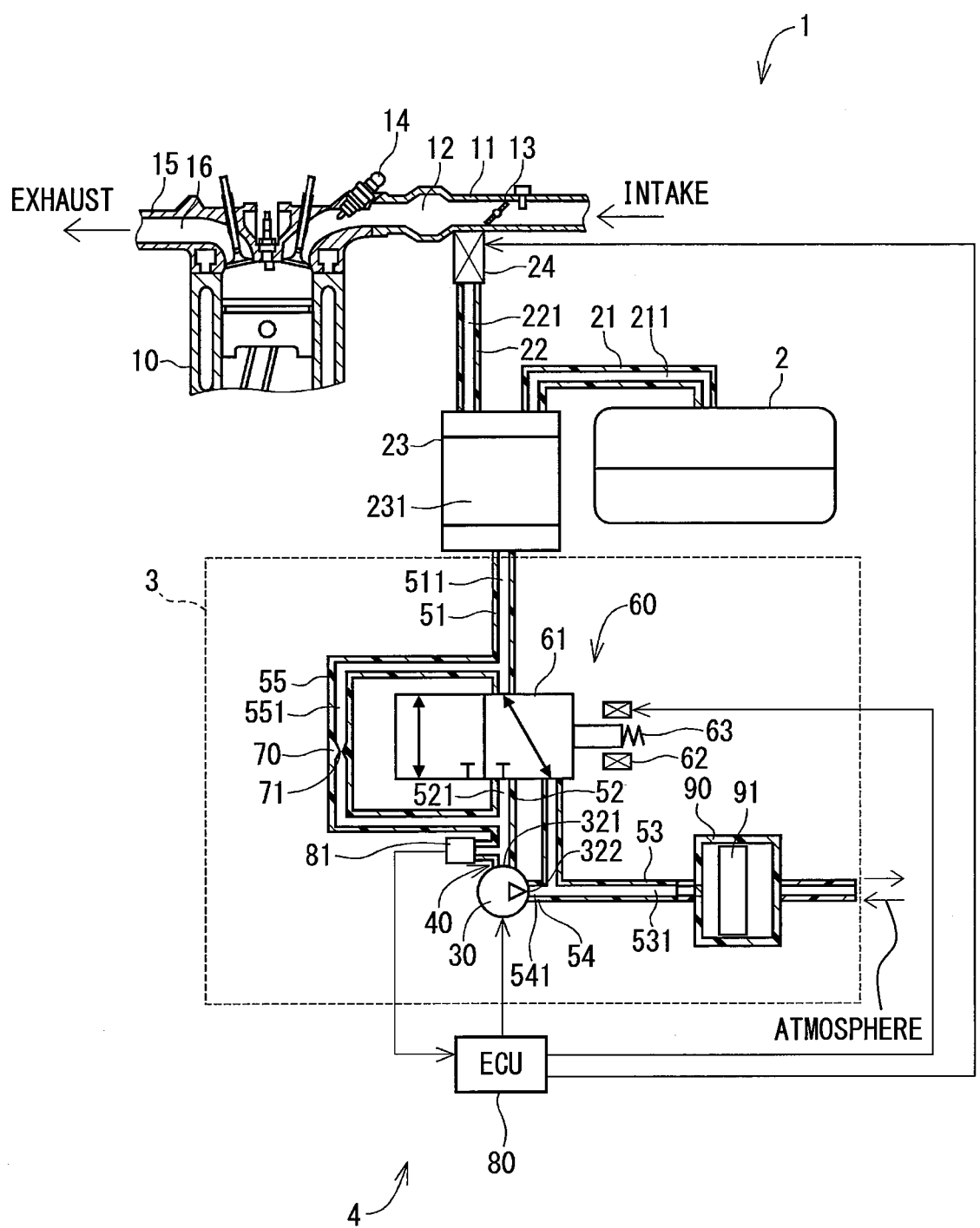
FIG. 1 is a schematic view showing a fuel vapor treatment system to which an assembling unit, a pump and a fuel-vapor-leakage check system are applied.

Referring to drawings, multiple embodiments of an assembling unit, a pump and a fuel-vapor-leakage check system will be described hereinafter. In each embodiment, the substantially same parts and the components are indicated with the same reference numeral and the same description will not be reiterated.

First Embodiment

FIG. 1 shows a fuel vapor treatment system to which an assembling unit, a pump and a fuel-vapor-leakage check system are applied.

The fuel vapor treatment system 1 is provided to an intake system of an internal combustion engine 10. An intake pipe 11 is connected to the engine 10. The intake pipe 11 defines an intake passage 12 therein. An opposite end of the intake pipe 11 is opened to atmosphere. When the engine 10 is driven, a fresh air is intaken into the engine 10 through the intake passage 12.

A throttle valve 13 is arranged in the intake passage 12. The throttle valve 13 adjusts an intake air flow rate which is intaken into the engine 10. A fuel injector 14 is provided to the intake pipe 11 between the throttle valve 13 and the engine 10. The fuel injector 14 injects gasoline stored in a fuel tank 2 into the intake passage 12. The injected fuel is mixed with the intake air and introduced into the engine 10. The fuel is combusted in a combustion chamber of the engine 10. The combusted fuel is discharged to atmosphere through an exhaust passage 16 which an exhaust pipe 15 defines. In the fuel tank 2, a fuel vapor of gasoline is generated.

The fuel vapor treatment system 1 includes a first purge pipe 21, a second purge pipe 22, a canister 23, a purge valve 24, a fuel-vapor-leakage module 3, and an electronic control unit (ECU) 80.

The fuel-vapor-leakage module 3 and the ECU 80 configure the fuel-vapor-leakage check system 4. The ECU 80 corresponds to a control portion.

The fuel vapor treatment system 1 introduces the fuel vapor into the engine 10. The fuel-vapor-leakage check system 4 detects a leakage of the fuel vapor from the fuel tank 2, the canister 23, and the purge pipes 21, 22.

The first purge pipe 21 defines a first purge passage 211 of which one end communicates with an interior of the fuel tank 2. The second purge pipe 22 defines a second purge passage 221 of which one end communicates with the intake passage 12. The canister 23 communicates with the other end of the first purge passage 211 and the other end of the second purge passage 221. The first purge passage 211 and the second purge passage 221 connect the intake passage 12 and an interior of the fuel tank 2 through the canister 23.

The canister 23 has an adsorbent 231, such as activated carbon. The canister 23 adsorbs a part of fuel vapor flowing through the first purge passage 211 and the second purge passage 221. A part of adsorbed fuel vapor is purged from the canister 23 and is introduced into the intake passage 12 through the second purge passage 221. The canister 23 restricts an emission of the fuel vapor to the atmosphere and prevents an adhering of the fuel vapor on a pump 30.

The purge valve 24 is an electromagnetic valve which is arranged in the second purge passage 22 in a vicinity of the intake passage 12. The purge valve 24 opens and closes the second purge passage 221, whereby it is permitted or prohibited that the fuel vapor flows from the canister 23 toward the intake passage 12 in the second purge passage 221. When the purge valve 24 is energized, the purge valve 24 is opened. When deenergized, the purge valve 24 is closed.

Figure 2:
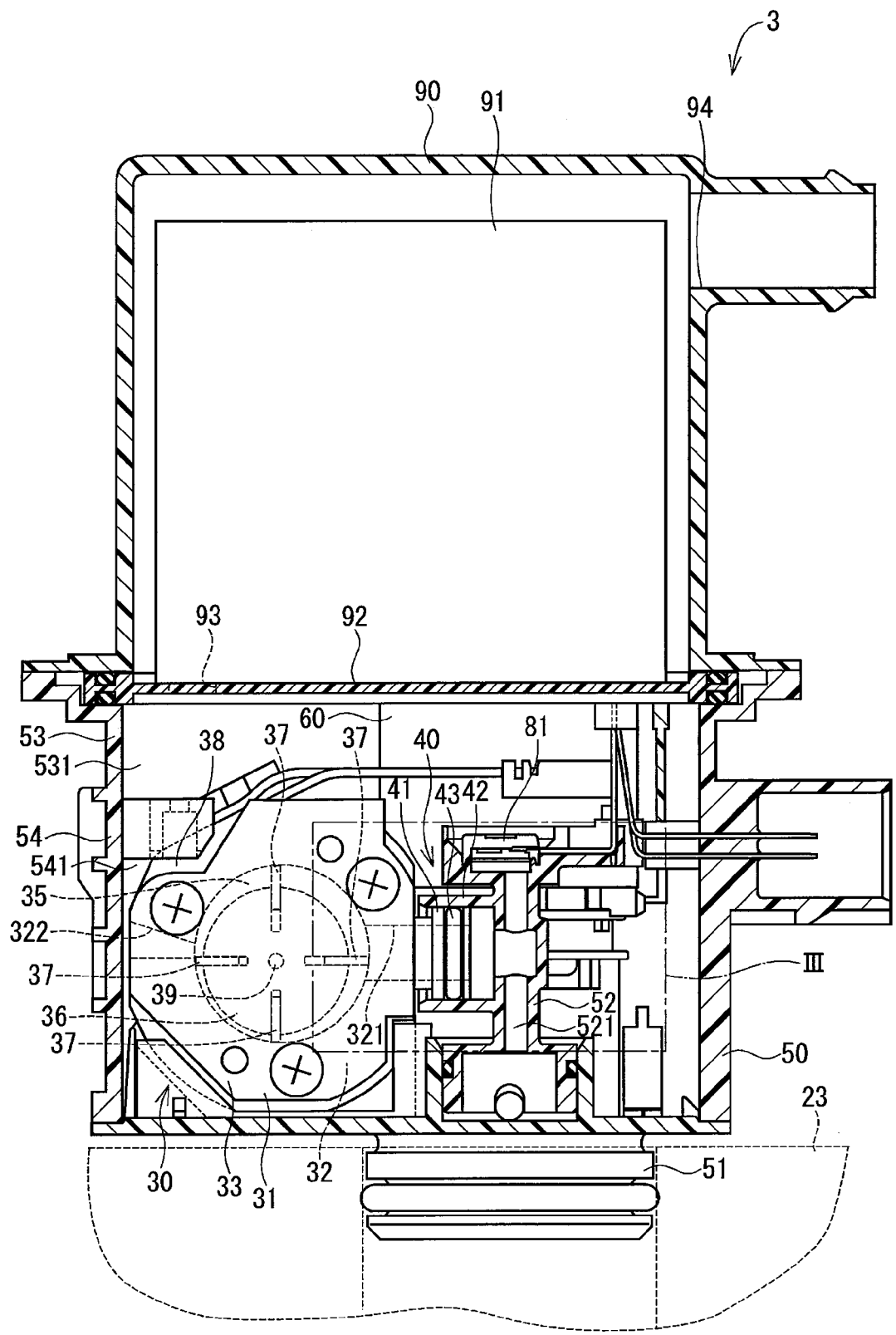
FIG. 2 is a cross-sectional view showing a fuel-vapor-leakage check module according to a first embodiment.

As shown in FIGS. 1 and 2, the fuel-vapor-leakage module 3 has a housing 50, a pump 30, a tank pipe 51, a pump pipe 52, an atmosphere pipe 53, a switching valve 60, an orifice pipe 55, an orifice-defining portion 70, a pressure sensor 81, a filter case 90 and a filter 91.

The housing 50 is cup-shaped.

Figure 3A:
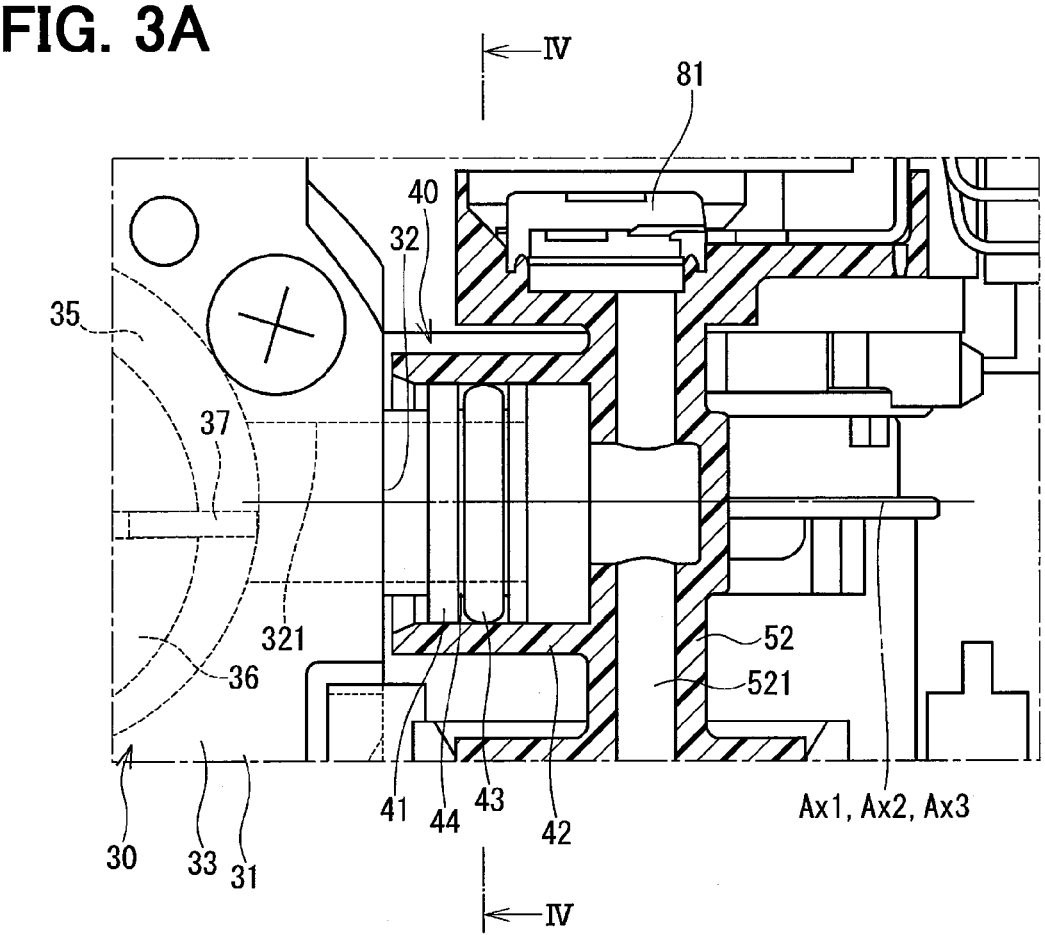
FIG. 3A is an enlarged view of a portion III in FIG. 2.
Figure 3B:
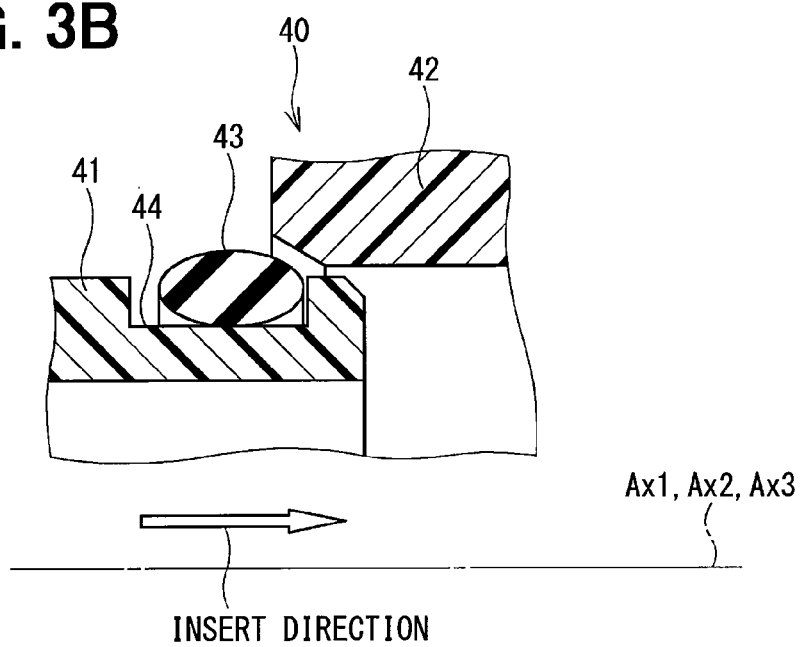
FIG. 3B is a cross sectional view showing an assembling unit.
Figure 4:
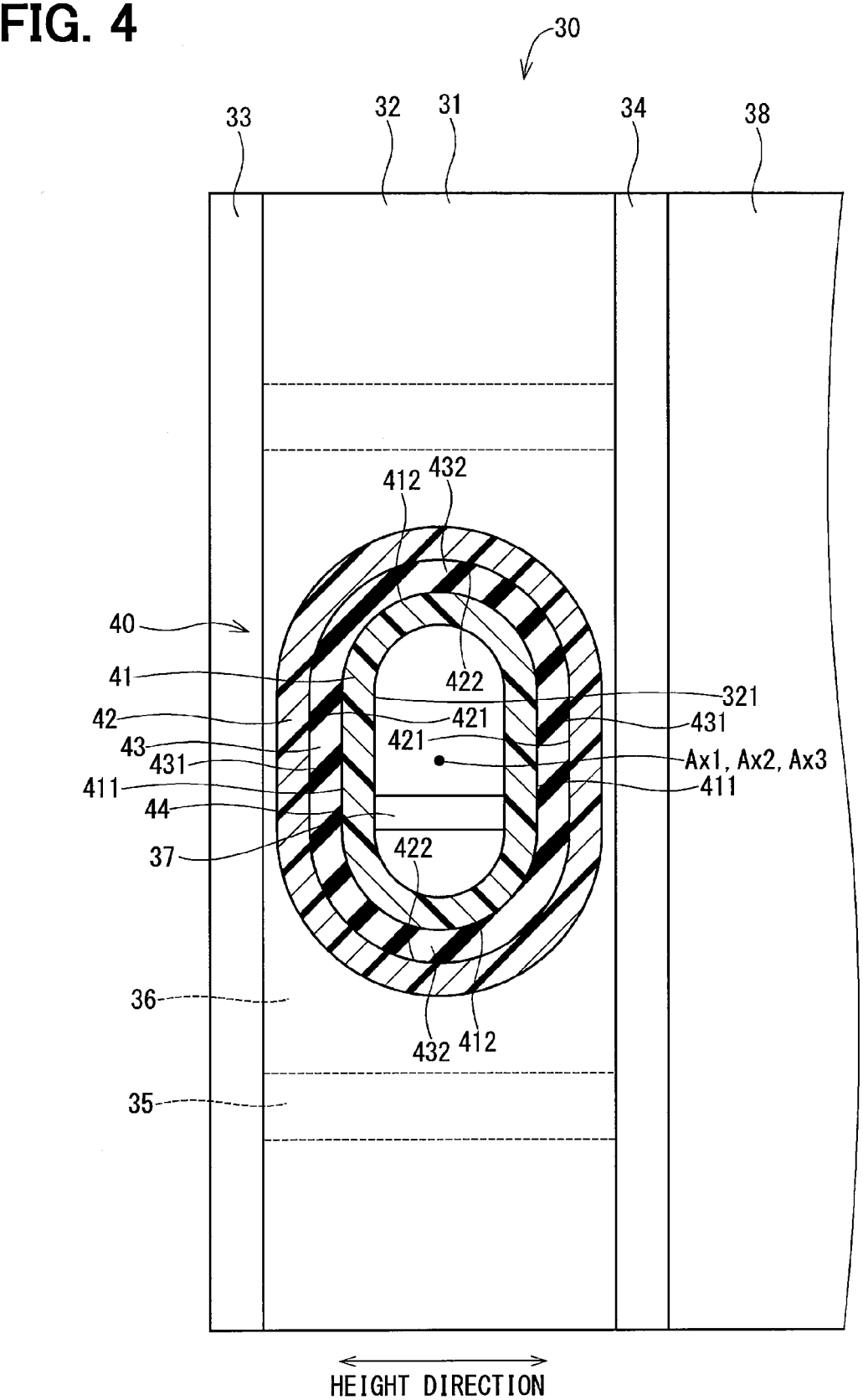
FIG. 4 is a cross sectional view taken along a line IV-IV in FIG. 3A.

As shown in FIGS. 2 to 4, the pump 30 is provided with a pump body 31 and an assembling unit 40. The pump 30 is accommodated in the housing 50. The pump body 31 has a cam ring 32, plate portions 33, 34, a pump chamber 35, a rotor 36, a vane 37 and a motor 38.

The cam ring 32 is made from resin material and is formed cylindrical. An axial length of the cam ring 32, that is, a height of the cam ring 32 is relatively small. The cam ring 32 defines a suction portion 321 and a discharge portion 322. As shown in FIG. 4, according to the present embodiment, a cross sectional shape of the suction portion 321 is an ellipse of which minor axis extends in a height direction of the cam ring 32 and major axis extends in a direction perpendicular to the height direction. Thus, even in a case that the suction portion 321 is defined in the cam ring 32 of which height is relatively short, the fluid passage area of the suction portion 321 can be ensured enough.

The plate portions 33, 34 are made from resin material. One of the plate portions 33, 34 closes an opening end of the cam ring 32. The other of the plate portions 33, 34 closes the other opening end of the cam ring 32. A pump chamber 35 is defined between the plate portions 33, 34 and an inner wall surface of the cam ring 32. The pump chamber 35 is formed in approximately cylindrical shape. The suction portion 321 and the discharge portion 322 connect the pump chamber 35 and an exterior of the cam ring 32.

The rotor 36 is made from resin material and is columnar shaped. The rotor 36 is eccentrically arranged in the pump chamber 35. The rotor 36 can rotate in the pump chamber 35.

The vane 37 is reciprocatively provided into a groove formed outer wall of the rotor 36. In the present embodiment, four vanes 37 are provided. When the rotor 36 rotates, each vane 37 reciprocates in the groove. Outer end of each vane 37 slides on an inner wall surface of the cam ring 32. Along with a rotation of the rotor 36, an external fluid is suctioned into the pump chamber 35 through the suction portion 321, and pressurized fluid is discharged through the discharge portion 322. The pump 30 is a vane pump.

The motor 38 is a three-phase brushless motor. When the motor 38 is energized, a motor shaft 39 rotates. The motor shaft 39 is connected to the rotor 36. Thus, when the motor 38 is energized, the rotor 36 is rotated. According to the present embodiment, the motor 38 drives the pump 30 so that the fluid is introduced into the pump chamber 35 through the suction portion 321 and the fluid is discharged from the pump chamber 35 through the discharge portion 322.

The assembling unit 40 is disposed in the housing 50 close to the suction portion 321. The assembling unit 40 is provided with a first tubular portion 41, a second tubular portion 42, and a sealing member 43.

The first tubular portion 41 is cylindrically shaped. The first tubular portion 41 and the suction portion 321 are formed integrally. That is, the first tubular portion 41 and the cam ring 32 are formed integrally.

As shown in FIGS. 3A and 3B, the first tubular portion 41 has an annular groove 44 on its outer periphery.

The second tubular portion 42 is also cylindrically shaped. An inner diameter of the second tubular portion 42 is greater than an outer diameter of the first tubular portion 41. As shown in FIGS. 2 to 4, the second tubular portion 42 and the first tubular portion 41 are arranged concentrically.

The sealing member 43 is annularly shaped and is made from rubber of which elasticity modulus is less than a specified value. The sealing member 43 is engaged with the groove 44 of the first tubular portion 41. Thus, the sealing member 43 is hardly displaced in an axial direction.

Before the sealing member 43 is engaged with the groove 44, a circumferential length of an inner periphery of the sealing member 43 is smaller than a circumferential length of the groove 44. After the sealing member 43 is engaged with the groove 44, a circumferential length of an outer periphery of the sealing member 43 is greater than a circumferential length of the inner wall surface of the second tubular portion 42. Therefore, when the first tubular portion 41, the second tubular portion 42 and the sealing member 43 are assembled so that the sealing member 43 is located between the first tubular portion 41 and the second tubular portion 42, the sealing member 43 is compressed by the first tubular portion 41 (groove 44) and the second tubular portion 42. The sealing member 43 keeps an air-tightness and a liquid-tightness between the first tubular portion 41 and the second tubular portions 42.

The configuration of the assembling unit 40 will be described later.

As shown in an FIG. 1, the tank pipe 51 defines a tank passage 511 therein. One end of the tank passage 511 connected to the canister 23. That is, the tank passage 511 communicates with the interior of the fuel tank 2 through the canister 23 and the first purge passage 211. As shown in FIG. 2, the tank pipe 51 is formed integrally with the housing 50. The tank pipe 51 is inserted into the canister 23.

As shown in FIG. 1, a pump pipe 52 defines a pump passage 521 therein. One end of the pump passage 521 communicates with the suction portion 321 of the pump 30. The other end of the pump passage 521 communicates with the tank passage 511. As shown in FIG. 2, the housing 50 and the pump pipe 52 are formed independently. The above-mentioned second tubular portion 42 is connected to the pump pipe 52. Thus, the pump passage 521 communicates with the suction portion 321 of the pump 30 through the second tubular portion 42 and the first tubular portion 41.

As shown in FIG. 1, the atmosphere pipe 53 defines an atmosphere passage 531. One end of the atmosphere passage 531 is opened to atmosphere through a filter case 90. The other end can be connected to the tank passage 511. In the present embodiment, a connecting pipe 54 is provided between the atmosphere pipe 53 and the pump 30. The connecting pipe 54 defines a connecting passage 541. One end of the connecting passage 541 communicates with the atmosphere passage 531, and the other end communicates with the discharge portion 322 of the pump 30. As shown in FIG. 2, the atmosphere pipe 53, the connecting pipe 54 and the housing 50 are made integrally. That is, the atmosphere passage 531 and the connecting passage 541 are defined by an inner wall surface of the housing 50.

As shown in FIG. 1, the switching valve 60 is arranged between the tank passage 511, the pump passage 521 and the atmosphere passage 531. The switching valve 60 has a valve body 61, a solenoid portion 62 and a biasing member 63. The valve body 61 is switched so that the atmosphere passage 531 communicates with the tank passage 511 or the atmosphere passage 531 communicates with the pump passage 521. The solenoid portion 62 can generates a magnetic force to attract the valve body 61. The biasing member 63 biases the valve body 61 so as to be apart from the solenoid portion 62.

When the solenoid portion 62 is not energized, the tank passage 511 communicates with the atmosphere passage 531. At this time, the tank passage 511 and the pump passage 521 are communicated with each other through an orifice passage 511 which will be described late. Meanwhile, when the solenoid portion 62 is energized, the tank passage 511 communicates with the atmosphere passage 531. As shown in FIG. 2, it should be noted that the switching valve 60 is arranged in the housing 50.

As shown in FIG. 1, the orifice pipe 55 defines an orifice passage 551 therein. The orifice passage 551 bypasses the switching valve 60 in such a manner as to connect the tank passage 511 and the pump passage 521.

The orifice-defining portion 70 is provided to the orifice passage 551. The orifice-defining portion 70 defines a reference orifice 71. A fluid passage area of the reference orifice 71 is smaller than an opening area of an opening through which the fuel vapor may leak from the fuel tank 2. For example, according to regulations established by the California Air Resources Board (CARB) and the Environmental Protection Agency (EPA), it is required to detect a fuel vapor leakage from an opening which corresponds to an aperture of which diameter is 0.5 mm. In the present embodiment, the reference orifice 71 has a diameter of 0.5 mm. The pressure sensor 81 is arranged in the pump pipe 52 to detect the pressure in the pump passage 521.

As shown in FIG. 2, the filter case 90 is cup-shaped. An opening end of the filter case 90 is connected to an opening end of the housing 50. A partition plate 92 is disposed between the filter case 90 and the housing 50. The partition plate 92 has a through-hole 93 through which the atmosphere passage 531 communicates with an interior of the filter case 90. Moreover, the filter case 90 has an inlet opening 94. The atmospheric air flows through the inlet opening 94, the interior of the filter case 90, and the through-hole 93, and then flows into the atmosphere passage 531. Moreover, the air in the atmosphere passage 531 can flow out through the through-hole 93, the interior of the filter case 90 and the into the atmospheric-air side via the inside of the hole 93 and the inlet opening 94.

The filter 91 is disposed inside of the filter case 90. The filter 91 is made from nonwoven fabric. The filter 91 removes a foreign matter from the air flowing through the filter case 90.

The ECU 80 is a microcomputer having a CPU, a ROM, a RAM, and an input/output portion. The ECU 80 receives various signals from sensors provided to a vehicle. The ECU 80 controls the operations of the purge valve 24, the pump 30 (motor 38), and the switching valve 60.

When negative pressure is generated in the intake passage 12, the ECU 80 opens the purge valve 24. Thereby, the fuel vapor adsorbed by the canister 23 is introduced into the engine 10 through the intake passage 12. Thus, the fuel vapor treatment system 1 can combust the fuel vapor in the engine 10. The ECU 80 computes a target purge quantity based on an operational state of the engine 10 and determines a valve opening timing and a valve opening period based on the target purge quantity.

Moreover, when the purge valve 24 is opened to purge the fuel vapor, the ECU 80 controls the switching valve 60 so that the tank passage 511 communicates with the atmosphere passage 531. The atmospheric air flows into the canister 23 through the atmosphere passage 531 and the tank passage 511. The fuel vapor adsorbed by the canister 23 is purged smoothly. As above, the ECU 80 opens the purge valve 24, so that the adsorbed fuel vapor in the canister 23 is introduced into the engine 10 through the intake passage 12.

The ECU 80 controls the operation of the pump 30. The pump 30 suctions air through the suction portion 321, and discharges the air through the discharge portion 322. While the tank passage 511 and the pump passage 521 are connected with each other and the motor 38 drives the pump 30, the interior of the fuel tank 2 is decompressed through the first purge passage 211, the canister 23, the tank passage 511 and the pump passage 521.

The pressure sensor 81 transmits the detected signals to the ECU 80. Thus, the ECU 80 can detect the pressure in the pump passage 521. When the tank passage 511 communicates with the atmosphere passage 531, the pressure sensor 81 detects the pressure of the air passed through the reference orifice 81. The detected air pressure is referred to as a reference pressure "Pr".

The ECU 80 determines whether a fuel vapor leaks from the fuel tank based on the reference pressure "Pr" and a pressure in the compressed fuel tank 2.

The motor 38 is provided with a rotation sensor (not shown). The ECU 80 can detect the rotating speed of the motor 38. The ECU 80 can drive the motor 38 at any speed by the PMW control.

Referring to FIGS. 3 to 5, a configuration of the assembling unit 40 will be explained, hereinafter.

As shown in FIG. 4, the first tubular portion 41 extends from the suction portion 321, and is shaped in such a manner that an outer periphery of a cross sectional shape perpendicular to an axis Ax1 is a non-perfect circle. More specifically, relative to the axis Ax1, the cross sectional shape of the first tubular portion 41 has two straight portions 411 and two arc portions 412 at a position where the groove 44 is formed. An aspect ratio of the cross sectional shape of the first tubular portion 41 is greater than 1.0. The aspect ratio is a ratio between a longitudinal length and its vertical length. An outer periphery shape of the cross sectional shape of the first tubular portion 41 relative to the axis Ax1 is an ellipse.

The first tubular portion 41 is formed in such a manner that the axis Ax1 is on a virtual plane which is perpendicular to an axis of the cam ring 32. A minor axis of the cross sectional shape of the first tubular portion 41 is perpendicular to the virtual plane. A major axis of the cross sectional shape of the first tubular portion 41 is parallel to the virtual plane.

As shown in FIG. 4, the second tubular portion 42 surrounds the first tubular portion 41. More specifically, relative to the axis Ax2, the cross sectional shape of the second tubular portion 42 has two straight portions 421 and two arc portions 422.

Figure 5A:
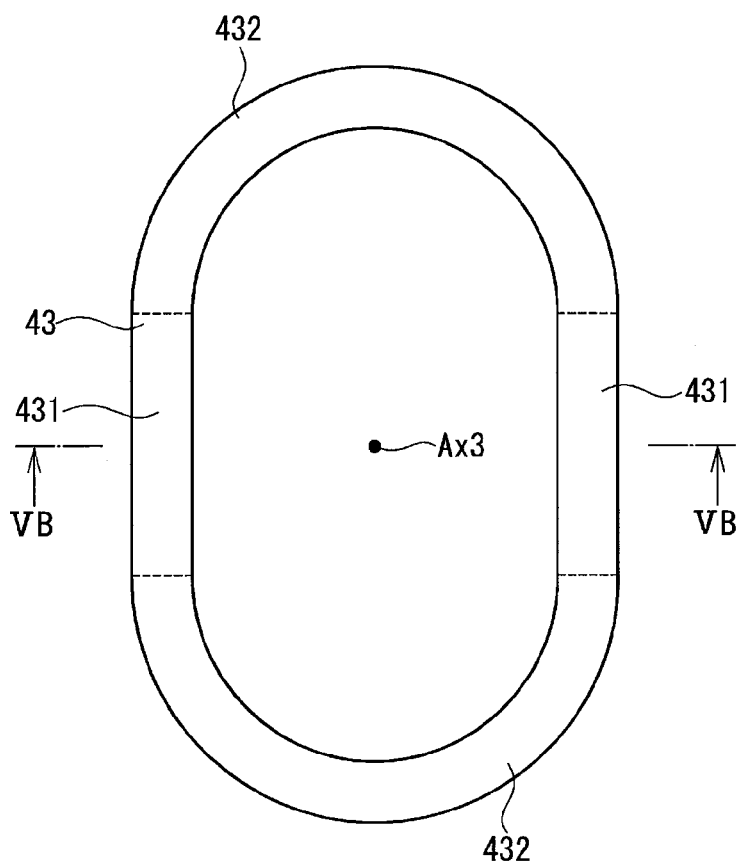
FIG. 5A is a plan view showing a sealing member according to a first embodiment.

As shown in FIG. 5A, the sealing member 43 is formed in such a manner as to be engaged with the groove 44 of the first tubular portion 41. The sealing member 43 has two straight portions 421 and two arc portions 432.

Figure 5B:
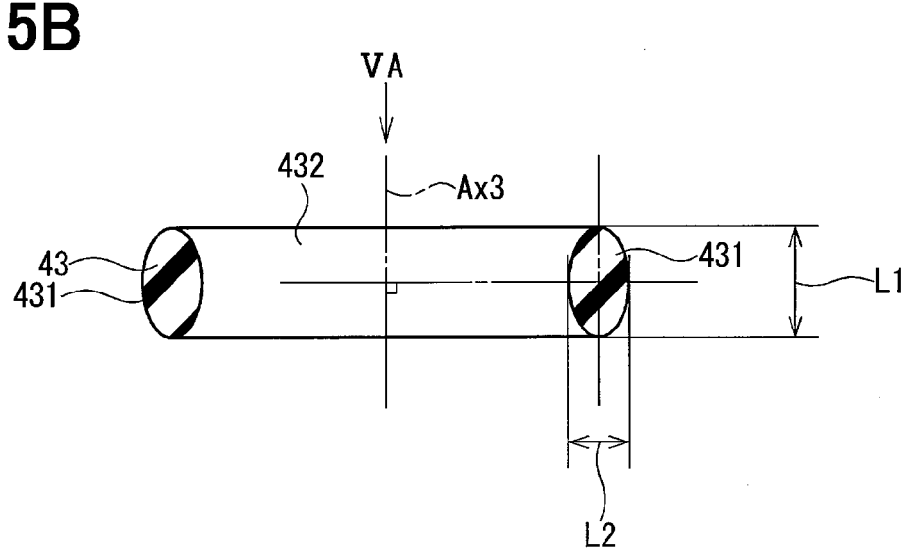
FIG. 5B is a cross sectional view taken along a line VB-VB in FIG. 5A.

As shown in FIG. 5B, a cross sectional shape of the sealing member 43 is an ellipse. A length L1 is greater than a length L2. An aspect ratio of the cross sectional shape of the sealing member 43 is greater than 1.0.

As shown in FIG. 3B, an opening end of the second tubular portion 42 has an inner wall which is tapered. An opening end of the first tubular portion 41 has an outer wall which is tapered.

FIG. 3B shows an assembling step of the assembling unit 40. First, the sealing member 43 is engaged with the groove 44 of the first tubular portion 41. Then, while the inner wall of the second tubular portion 42 is in contact with an outer periphery of the sealing member 43, the first tubular portion 41 is inserted into the second tubular portion 42 in a direction of the axis Ax1.

Since the cross sectional shape of the first tubular portion 41 relative to the axis Ax1 is a non-perfect circle, when the sealing member is engaged with the groove, a strained force of the sealing member 43 is not uniform around the first tubular portion 41. When the first tubular portion 41 and the second tubular portion 42 relatively moves in their axial direction, it is likely that the sealing member 43 may be rotated in such a manner that the inner periphery moves toward the outer periphery and the outer periphery moves toward the inner periphery. Also, it is likely that a twist may be generated in the sealing member 43.

However, according to the present embodiment, a cross sectional shape of the sealing member 43 is an ellipse. The length L1 is greater than the length L2 as shown in FIG. 5B. Thus, it can be restricted that the sealing member 43 is rotated between the first tubular portion 41 and the second tubular portion 42. Also, it can be restricted that a twist is generated in the sealing member 43.

When the sealing member 43 abuts on an inner surface of the second tubular portion 42, a tangential line of the sealing member to the inner surface of the second tubular portion 42 becomes smaller than that of a sealing member of a perfect circle.

Moreover, since the opening end of the second tubular portion 42 has the inner wall which is tapered, the sealing member 43 is hardly damaged by the edge of the second tubular portion 42 when the first tubular portion is inserted into the second tubular portion 42.

Figure 6A:
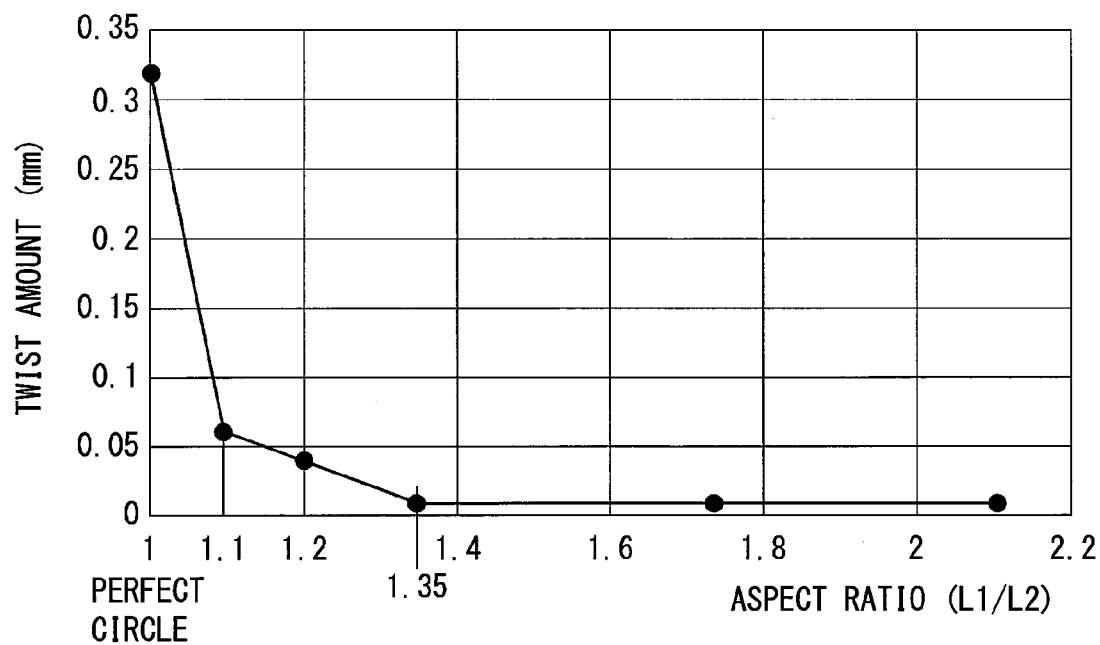
FIG. 6A is a graph showing a relationship between an aspect ratio and a twist amount of the sealing member.
Figure 6B:
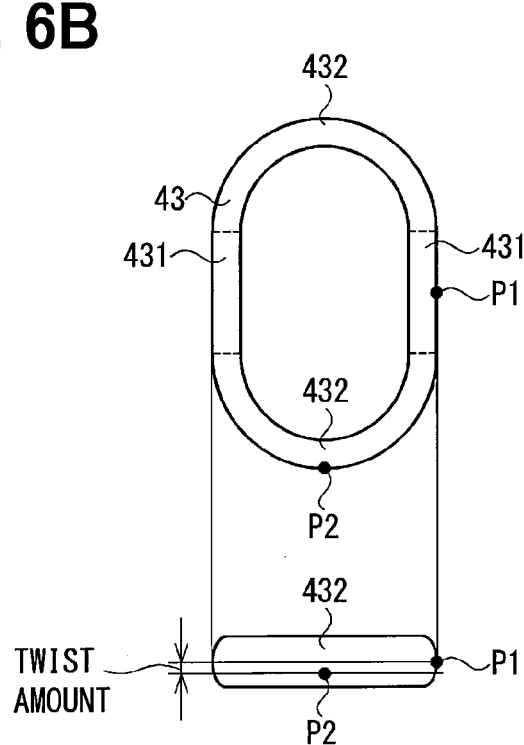
FIG. 6B is a chart for explaining a twist amount of the sealing member.

FIG. 6A is a graph showing a relationship between the aspect ratio (L1/L2) and a twist amount of the sealing member 43. "L2" is set to 1.9 mm. The twist amount of the sealing member 43 is a maximum difference of a rotation amount at arbitrary points of the sealing member 43. For example, as shown in FIG. 6B, in the present embodiment, the twist amount of the sealing member 43 corresponds to a difference of the rotation amount between a point "P1" and a point "P2".

In view of FIG. 6A, when the cross sectional shape of the sealing member 43 is a perfect circle, that is, when the aspect ratio is 1.0, the twist amount is about 0.32 mm. When the aspect ratio is 1.1, the twist amount is about 0.32 mm. When the aspect ratio is 1.35 or more, the twist amount is about 0.01 mm. Therefore, in the present embodiment, it is preferable that the aspect ratio of the cross sectional shape is 1.1 or more. Furthermore, in order to reduce the twist amount, it is preferable that the aspect ratio of the cross sectional shape is 1.35 or more. When the aspect ratio is 1.35, "L1" is about 2.57 mm.

Second Embodiment

Figure 7A:
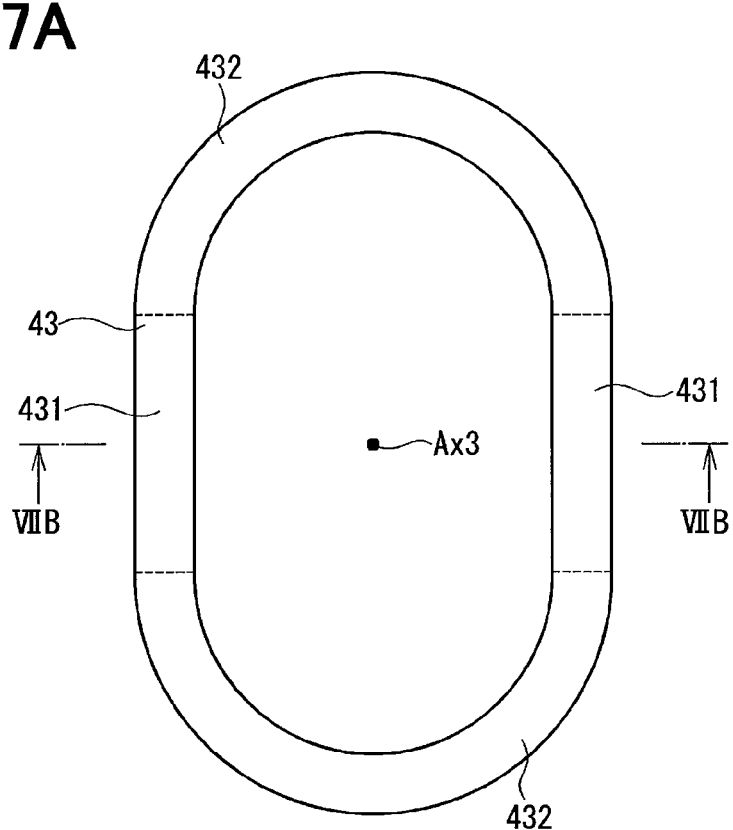
FIG. 7A is a plan view showing a sealing member according to a second embodiment.
Figure 7B:
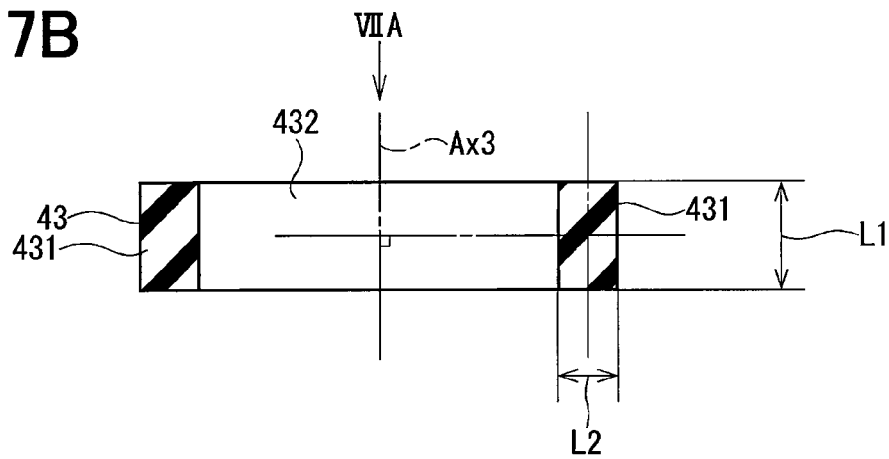
FIG. 7B is a cross sectional view taken along a line VIIB-VIIB in FIG. 7A.
Figure 7C:
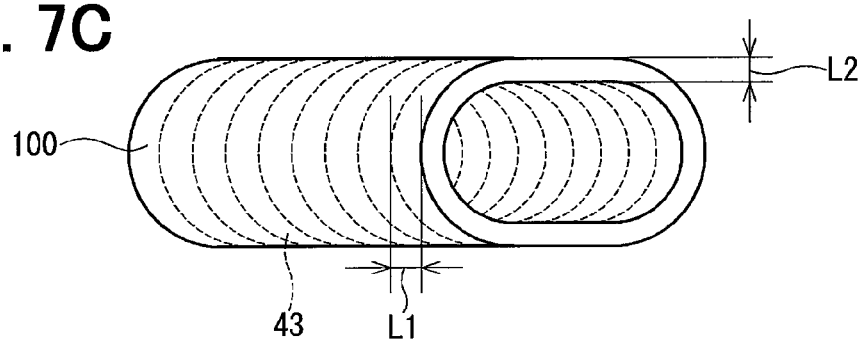
FIG. 7C is a chart for explaining a forming method of the sealing member.

FIGS. 7A to 7C illustrate a sealing member according to a second embodiment.

A cross sectional shape of the sealing member 43 is a rectangular.

An aspect ratio of the cross sectional shape of the sealing member 43 (L1/L2) is greater than 1.0. Thus, when the assembling unit 40 is assembled, it is restricted that the sealing member 43 is twisted. The airtightness and the liquid-tightness between the first tubular portion 41 and the second tubular portion 42 can be improved.

As shown in FIG. 7C, the sealing member 43 can be formed by cutting a cylindrical rubber tube 100 in round slices at an interval "L1". A wall thickness of the rubber tube 100 is "L2". A plurality of sealing members 43 can be formed easily in a specified time period.

Third Embodiment

Figure 8A:
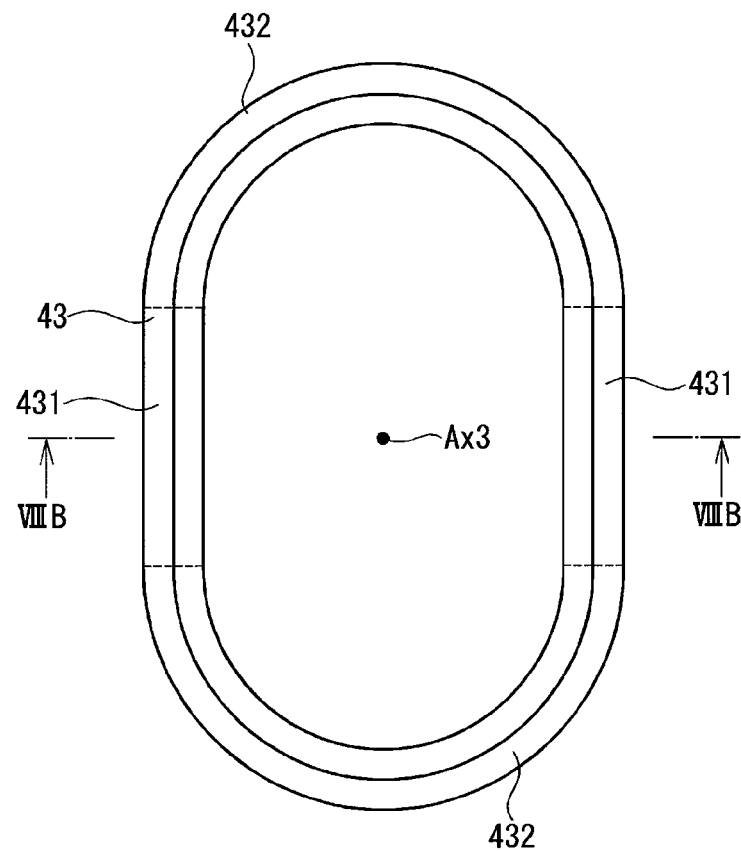
FIG. 8A is a sectional view showing a sealing member according to a third embodiment.
Figure 8B:
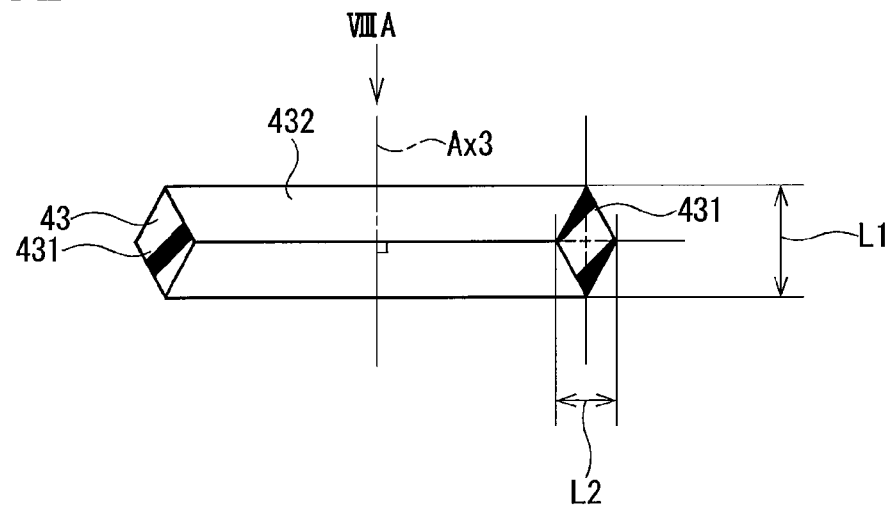
FIG. 8B is a cross sectional view taken along a line VIIIB-VIIIB in FIG. 8A.

FIGS. 8A and 8B illustrate a sealing member according to a third embodiment.

A cross sectional shape of the sealing member 43 is a rhombus.

A length L1 is greater than a length L2. An aspect ratio of the cross sectional shape of the sealing member 43 (L1/L2) is greater than 1.0. Thus, when the assembling unit 40 is assembled, it is restricted that the sealing member 43 is twisted. The airtightness and the liquid-tightness between the first tubular portion 41 and the second tubular portion 42 can be improved.

Other Embodiment

According to another embodiment, each of the cross sectional shapes of the first tubular portion and the second tubular portion can be an ellipse or a polygonal as long as it is a non-perfect circle.

Moreover, in another embodiment, the aspect ratios of the cross sectional shape of the first tubular portion and the second tubular portion may be 1.0.

The cross sectional shape of the sealing member is not limited to an ellipse, a rectangular, and a rhombus. Moreover, as long as the aspect ratio of the cross sectional shape of the sealing member is greater than 1.0, the aspect ratio can be set to any value. Moreover, the length "L2" of the sealing member may be set to a value other than 1.9 mm.

The opening end of the second tubular portion 42 may not have an inner wall which is tapered.

Moreover, in another embodiment, the first tubular portion may be arranged outside of the second tubular portion. In this case, the annular groove is formed on an inner wall surface of the first tubular portion, or an outer wall surface of the second tubular portion.

Moreover, in another embodiment, the groove is not always necessary. The sealing member can be disposed between the first tubular portion and the second tubular portion without forming the groove.

Moreover, in another embodiment, the first tubular portion may be formed integrally with the discharge portion of the pump.

Moreover, in another embodiment, it can be determined whether a fuel-vapor-leakage occurs in a condition that the interior of the fuel tank is pressurized. In this case, the air is suctioned through the discharge portion 322 and is discharged through the suction portion 321. The material of the sealing member may be other than rubber material. The reference orifice may be set to any value.

The motor is not always a three-phase brushless motor. The present disclosure is not limited to the embodiments mentioned above, and can be applied to various embodiments.

What is claimed is:

1. A pump comprising:
   a first tubular portion of which cross sectional shape is a non-perfect circle relative to an axis thereof;
   a second tubular portion disposed concentrically with the first tubular portion, the second tubular portion having a cross sectional shape relative to its axis, which is a congruent shape of the cross sectional shape of the first tubular portion; and
   an annular sealing member disposed between the first tubular portion and the second tubular portion for sealing therebetween; and
   a pump body including a suction portion for suctioning a fluid and a discharge portion for discharging a pressurized fluid, wherein:
   the sealing member has a cross sectional shape of which length parallel to its axis is greater than length which is perpendicular to the axis,
   the first tubular portion is formed integrally with the suction portion or the discharge portion,
   the pump body has a cylindrical cam ring, a pair of plate portions closing each opening end of the cam ring, and a pump chamber defined by an interior of the cam ring and the plate portions in such a manner as to communicate with the suction portion, and the discharge portion, and
   the first tubular portion is formed on an outer peripheral surface of the cam ring.

2. The pump according to claim 1, wherein
   the cross sectional shape of the first tubular portion has an aspect ratio which is other than 1.0.

3. The pump according to claim 1, wherein
   the sealing member has a cross sectional shape that is congruent to the shape of the first tubular portion before the sealing member is disposed between the first tubular portion and the second tubular portion.

4. The pump according to claim 1, wherein
   the sealing member has a rectangular cross sectional shape.

5. The pump according to claim 1, wherein
   the first tubular portion or the second tubular portion has a tapered opening end which confronts the sealing member.

6. The pump according to claim 1, wherein
   the first tubular portion or the second tubular portion has an annular groove, and
   the sealing member is engaged with the annular groove.

7. A fuel-vapor-leakage check system for detecting a fuel vapor leakage from a fuel tank based on a differential pressure between an interior and an exterior of the fuel tank, comprising:

the pump according to claim 1;

a tank pipe defining a tank passage of which one end communicates with the interior of the fuel tank;

a pump passage of which one end communicates with an interior of the second tubular portion and another end of which can communicate with the another end of the tank passage;

an atmosphere pipe defining an atmosphere passage of which one end is opened to atmosphere and another end can communicate with another end of the tank passage;

a switching valve disposed between another end of the tank passage, another end of the pump passage and atmosphere passage, the switching valve switching a passage connection between a first position in which the tank passage communicates with the atmosphere passage and a second position in which the tank passage communicates with the pump passage;

an orifice pipe defining an orifice passage connecting the tank passage and the pump passage;

an orifice-defining portion defining a reference orifice in the orifice passage;

a pressure detector detecting a pressure in the pump passage; and a control unit controlling operations of the pump, and the switching valve, wherein the control portion includes:

a reference pressure detecting portion which detects a reference pressure of an air passed through the reference orifice while the tank passage communicates with the atmosphere passage, and a leakage check portion determining whether a fuel vapor leakage from the fuel tank occurs based on the reference pressure and the pressure which the pressure detector detects while the tank passage communicates with the pump passage to decrease or increase the pressure in the fuel tank.

8. The pump according to claim 1, wherein the cross sectional shape of the first tubular portion has a longitudinal length and a vertical length, and the longitudinal length is longer than the vertical length.

* * * * *